United States Patent
Barnes, Jr.

[19]

[11] Patent Number: 6,158,869
[45] Date of Patent: Dec. 12, 2000

[54] PUDDLE AND FOOTWELL LIGHTING INTEGRATED INTO A SPEAKER GRILLE

[75] Inventor: Lee E. Barnes, Jr., Southfield, Mich.

[73] Assignee: Top Source Technology, Inc., Palm Beach Gardens, Fla.

[21] Appl. No.: 09/078,381

[22] Filed: May 13, 1998

[51] Int. Cl.[7] .............................. H04M 1/22; B60Q 1/00
[52] U.S. Cl. ............................................. 362/86; 362/501
[58] Field of Search ............................ 362/86, 488, 545, 362/234, 501

[56] References Cited

U.S. PATENT DOCUMENTS

| D. 244,781 | 6/1977 | Saidel | D14/39 |
|---|---|---|---|
| D. 282,687 | 2/1986 | McMahon | D26/139 |
| D. 287,888 | 1/1987 | Castor et al. | D26/59 |
| D. 289,282 | 4/1987 | Ohtsuji et al. | D14/39 |
| D. 289,894 | 5/1987 | Ohtsuji et al. | D14/39 |
| D. 317,768 | 6/1991 | Davidson | D14/219 |
| D. 323,327 | 1/1992 | Davidson | D14/219 |
| D. 389,152 | 1/1998 | Kurihara | D14/219 |
| 2,501,968 | 3/1950 | Sassin | 362/86 |
| 4,334,211 | 6/1982 | McConnell et al. | 340/88 |
| 4,550,796 | 11/1985 | Tomita | 181/141 |
| 4,862,334 | 8/1989 | Ivey et al. | 362/149 |
| 4,875,143 | 10/1989 | Fernandez | 362/86 |
| 4,953,220 | 8/1990 | Murayama et al. | 381/86 |
| 5,255,162 | 10/1993 | Kawamoto | 362/26 |

*Primary Examiner*—Cassandra Spyrou
*Assistant Examiner*—Jared Treas
*Attorney, Agent, or Firm*—Dykema Gossett PLLC

[57] ABSTRACT

An apparatus is provided that integrates puddle and footwell lighting in a vehicle with a speaker grille. The apparatus includes a grille having a plurality of apertures configured to permit transmission of acoustic energy generated by a speaker or other audio device. The apparatus further includes a light emitting device configured to illuminate a surface, such as the floor of a vehicle or the ground outside of a vehicle, through the grille.

4 Claims, 1 Drawing Sheet

PUDDLE AND FOOTWELL LIGHTING INTEGRATED INTO A SPEAKER GRILLE

BACKGROUND OF THE INVENTION

1. Field of the Invention

This invention relates to puddle and footwell lighting in a motor vehicle and, more particularly, to an apparatus that integrates the puddle and footwell lighting into a speaker grille.

2. Disclosure of Related Art

A conventional vehicle door includes one or more light emitting devices. The devices are used in one instance to illuminate the floor or footwell of the vehicle to enable safe ingress to and egress from the vehicle. The devices are also used to illuminate a ground surface outside of the vehicle so that a passenger exiting the vehicle is able to avoid puddles of water or other obstacles disposed outside of the vehicle.

A conventional vehicle door may also include a speaker grille. The speaker grille may be used to protect an audio speaker or other audio device disposed behind the grille from damage resulting, for example, from contact by a passenger or object with the speaker. The grille may also be used to hide the speaker in order to provide a more pleasing aesthetic appearance.

Conventional implementations of puddle and footwell lighting and speaker grilles within vehicle doors suffer from several deficiencies. First, manufacture, installation, and assembly of the lighting and the grilles consumes valuable time. Second, the lighting and the grilles take up valuable space within the vehicle. Finally, conventional implementations of the lighting and the grilles may not provide an optimum aesthetic appearance.

Light emitting devices and speaker grilles have been combined for use in vehicular applications and in unrelated applications (e.g., dancing or other forms of entertainment). Conventional combinations, however, have primarily been concerned with providing aesthetic benefits as opposed to more functional benefits. One example of this is seen in U.S. Pat. No. 4,875,143 which discloses a novelty vehicle accessory in which one or more lights are made to appear as if they are moving in a circle around the speaker grille.

There is thus a need for an apparatus that will provide one or more of the above-mentioned benefits.

SUMMARY OF THE INVENTION

The present invention provides an apparatus that integrates the puddle/footwell lighting and speaker grille within a vehicle.

An object of the present invention is to provide an integrated lighting and speaker grille apparatus that will reduce the cost of manufacturing, assembling, and/or installing the lighting and grille.

Another object of the present invention is to provide an integrated lighting and speaker grille apparatus that will require less space within the vehicle when compared to conventional lighting devices and speaker grilles.

Yet another object of the present invention is to provide an integrated lighting and speaker grille apparatus that will provide a more pleasing aesthetic appearance.

An apparatus in accordance with the present invention meets these and other objectives by integrating the light emitting devices used to provide puddle and footwell lighting with a speaker grille. In particular, an apparatus in accordance with the present invention includes a grille having a plurality of apertures configured to permit transmission of acoustic energy generated by an audio device. The apparatus further includes a light emitting device disposed on one side the grille and configured to illuminate a surface, such as a vehicle floor region or a ground region outside of the vehicle, by emitting light through the grille. The light emitting device may be secured to the grille between first and second attachment members that extend from, and are integral with, the grille. By integrating the puddle/footwell lighting and speaker grille assemblies, valuable space is saved within the vehicle. Moreover, the time required to manufacture, assemble, and install the integrated lighting and grille apparatus is less than the time required to manufacture, assemble, and install the lighting and grille separately. Finally, integration of the puddle and footwell lighting with the speaker grille provides a more pleasing aesthetic appearance.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
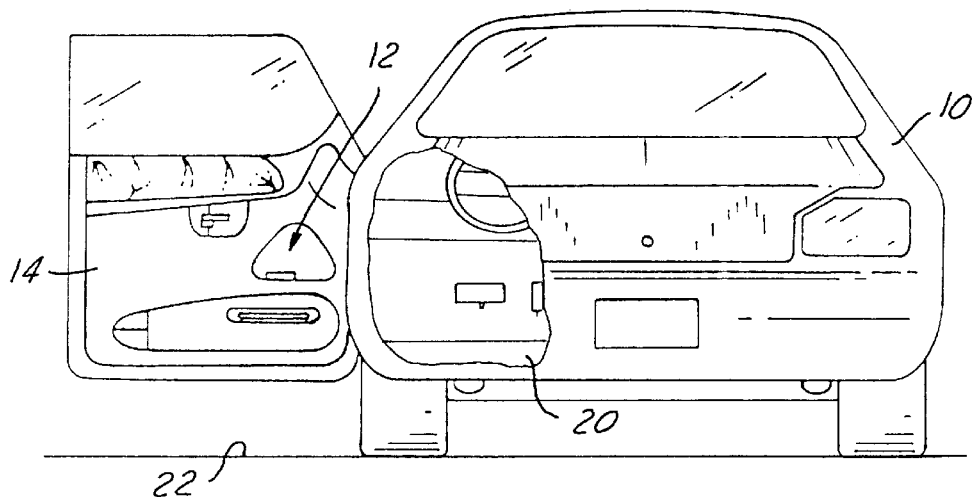
FIG. 1 is a rear plan view of a vehicle incorporating an apparatus in accordance with the present invention.
Figure 2:
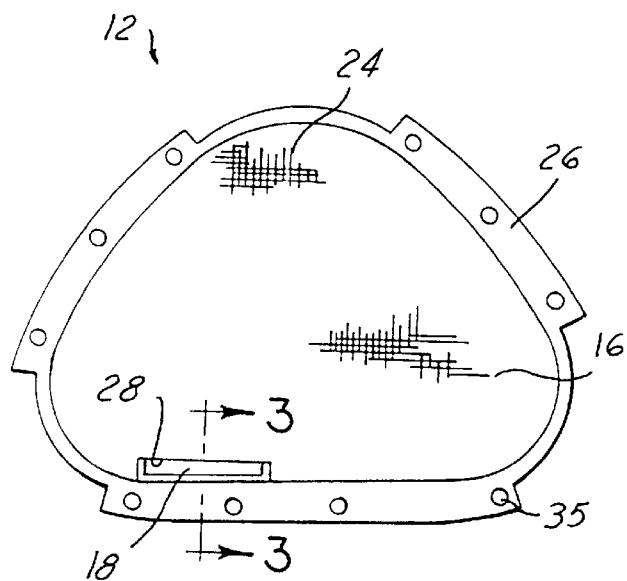
FIG. 2 is a front plan view of an apparatus in accordance with the present invention.

Referring now to the drawings wherein like reference numerals are used to identify identical components in the various views, FIG. 1 illustrates a vehicle 10 incorporating an apparatus 12 in accordance with the present invention. Apparatus 12 may be disposed within a door 14 of vehicle 10. It should be understood, however, that apparatus 12 may be located elsewhere within vehicle 10. Referring to FIGS. 1 and 2, apparatus 12 includes a grille 16 and a light emitting device 18 that illuminates a surface such as a floor region 20 of vehicle 10 or a ground region 22 disposed outside of vehicle 10. Floor region 20 may include, but is not limited to, the floor of vehicle 10, floor mats, brake and gas pedals, hood and/or trunk latches, controls for adjusting the vehicle seats, compartments or open areas beneath the vehicle seats, and the lip of the door frame. Ground region 22 may include, but is not limited to, the actual ground surface and rocks, puddles, or other obstacles disposed on or extending from the ground surface. It should be understood that apparatus 12 could be used to illuminate numerous surfaces both within and outside of vehicle 10.

Referring now to FIG. 2, grille 16 is provided to protect an audio speaker (not shown) or other audio device from damage resulting, for example, from contact by a passenger or object with the audio device. The audio device may be located within door 14 of vehicle 10. Grille 16 is also provided to hide the audio device and thereby present a more pleasing aesthetic appearance within vehicle 10. Grille 16 may be made from a variety of conventional metals and/or plastics, preferably capable of withstanding temperatures of at least one hundred and eighty degrees Fahrenheit, and may be produced through injection molding or metal stamping.

Figure 3:
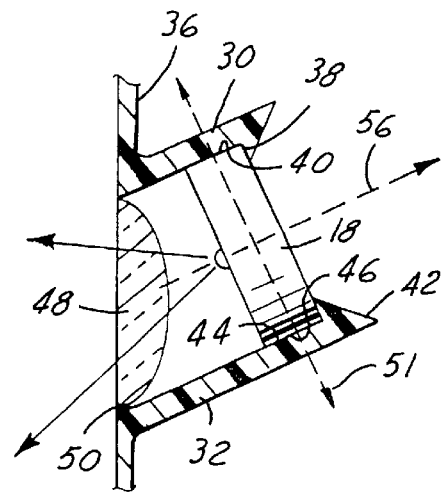
FIG. 3 is a cross-sectional view of the apparatus of FIG. 2 taken substantially along lines 3—3.

In a constructed embodiment, grille 16 is formed of polypropylene. In the illustrated embodiment, grille 16 has a rounded triangular shape. It should be understood, however, that grille 16 may assume a variety of shapes and sizes. Grille 16 includes a plurality of apertures 24, a plurality of flanges 26, and an opening 28 in which light emitting device 18 is disposed. As shown in FIG. 3, grille 16 may also includes means, such as first and second attachment members 30, 32, for attaching light emitting device 18 to grille 16.

Referring again to FIG. 2, apertures 24 are provided to permit transmission through grille 16 of acoustic energy generated by an audio speaker or other audio device. Apparatus 12 as a whole preferably allows about ninety-nine percent of the acoustic energy generated by the audio device to pass through apparatus 12. Apertures 24 also provide grille 16 with an air-transmission rate of about ninety-nine percent.

Flanges 26 are provided to allow grille 16 to be fastened to a panel 34 of door 14 (best shown in FIG. 1) or to another structure (which may be fixed) within vehicle 10. In the illustrated embodiment grille 16 includes three flanges 26, although the number of flanges 26 may vary. Grille 16 is fastened to panel 34 by inserting screws (not shown), bolts, or other fastening means through holes 35 in flanges 26 and into corresponding holes (not shown) within panel 34. It should be understood that various means for fastening grille 16 to panel 34 may be employed.

Opening 28 is provided to permit transmission of light from light emitting device 18 so as to illuminate a surface such as floor region 20 or ground region 22. In the illustrated embodiment, opening 28 is rectangular in shape. Opening 28 may assume various shapes and sizes, however, depending upon, for example, the lighting requirements of vehicle 10 and the size of light emitting device 18.

Referring now to FIG. 3, first and second attachment members 30, 32 are provided to attach light emitting device 18 to grille 16. It should be understood that various means for attaching device 18 to grille 16 may be employed including screws, bolts, or adhesives. The design and arrangement of attachment members 30, 32, however, is beneficial with respect to cost and ease of assembly. In the illustrated embodiment, members 30, 32 are integral with grille 16 and may be formed therewith by injection molding or metal stamping. Members 30, 32 are elastically deformable and are disposed on opposite sides of opening 28. Members 30, 32 extend from one side or face 36 of grille 16. Face 36 faces away from the interior of vehicle 10 and towards the speaker or other audio device. Members 30, 32 are arranged so as to be longitudinally parallel to the path of the acoustic energy generated by the audio device. Member 30 may form an acute angle (i.e., an angle measuring less than ninety degrees) with face 36 while member 32 may form an obtuse angle (i.e., an angle measuring between ninety and one hundred and eighty degrees) with face 36. This arrangement facilitates downward projection of light from device 18 (when installed) so that device 18 is capable of illuminating floor region 20 and/or ground region 22. Member 30 is substantially J-shaped in cross-section, having a flange 38 at one end of member 30. Flange 38 is configured to engage a first side 40 of device 18. Member 32 includes a triangular portion 42 at one end of member 32. Portion 42 includes a rectangular channel 44 located approximately at the apex of portion 42. Channel 44 is configured to receive a second side 46 of device 18, opposite side 40 of device 18.

Device 18 is attached to grille 16 by inserting device 18 through opening 28 (upwards and to the right in FIG. 3). As device 18 passes through opening 28, members 30, 32 deflect outwardly. Device 18 is then inserted within channel 44 of member 32 and pressed against flange 38 of member 30. It should be understood that device 18 may alternatively be pressed against flange 38 before inserting device 18 within channel 44. Because members 30, 32 are elastically deformable, members 30, 32 are biased into a tight-fitting engagement with device 18 once device 18 is secured between members 30,32.

Apparatus 12 may further include a lens 48 disposed within opening 28 of grille 16 and in front of device 18. Lens 48 may be used to disperse or spread light generated by device 18. Lens 48 may also be provided to improve the aesthetic appearance of apparatus 12. Lens 48 may be made of plastic or other conventional light transmissive materials and is transparent to allow a maximum amount of light to pass through lens 48. Lens 48 is preferably able to withstand temperatures up to one hundred and eighty degrees Fahrenheit. Lens 48 is configured to create a maximum dispersion of the light generated by device 18, and, in a constructed embodiment, disperses light along an angular span of about sixty degrees. Lens 48 may also include apertures (not shown) to allow a maximum amount of acoustic energy generated by the audio device to pass through lens 48.

Lens 48 may be secured within opening 28 of grille 16 by one or more flanges 50 that may be integral with grille 16. In particular, lens 48 may be snap-fit into opening 28 by inserting lens 48 through opening 28 (to the right in FIG. 3) and causing flanges 50 to deflect outwardly. Flanges 50 are elastically deformable and therefore return to the position shown in FIG. 3 once lens 48 is inserted, thereby securing lens 48 within opening 28.

Figure 4:
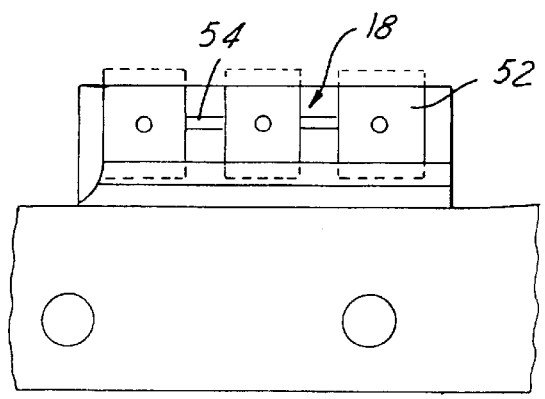
FIG. 4 is an enlarged front plan view of one portion of the apparatus of FIG. 2.

Referring now to FIG. 4, device 18 will be described in greater detail. Device 18 is provided to illuminate a surface, such as floor region 20 of vehicle 10 and/or ground region 22, by emitting light through grille 16. Device 18 is disposed on one side of grille 16 and will generally illuminate a surface disposed on the other side of grille 16. It should be understood, however, that device 18 could be used, along with one or more reflectors (not shown) to illuminate surfaces in various locations. Device 18 is preferably made of a transparent material and is able to generate light having a minimum intensity of five lux on the intended surface when disposed twenty-four inches above the surface. In one constructed embodiment, an axis 51 extending through device 18 creates an angle of about thirty degrees with face 36 of grille 16.

Device 18 may comprise one or more light emitting diodes 52. It should be understood, however, that other light emitting devices, such as conventional bulbs, may alternatively be utilized. Diodes 52 may comprise diodes sold by Hewlett-Packard, Inc. under the descriptive identifier "Super Flux White Light LEDs," having a preliminary part number HPWX-XXXX. Each of these diodes generates a flux of 800 mlm and disperses light in an angular span of about forty degrees. The diodes are substantially square in shape and measure about seven and one half millimeters on each side. In the illustrated embodiment, device 18 consists of a single row of light emitting diodes 52. It should be understood, however, that diodes 52 may be arranged in any two or three-dimensional configuration. Diodes 52 are connected to one another by a porous metal plate or slotted wiring 54 to allow a maximum amount of sound to be transmitted from the audio device through device 18. Referring again to FIG. 3, diodes 52 are capable of rotation about an axis 56 so that the illumination provide by device 18 can be adjusted.

While the invention has been particularly shown and described with reference to the preferred embodiments thereof, it is well understood by those skilled in the art that various changes and modifications can be made in the invention without departing from the spirit and scope of the invention.

What is claimed is:

1. An apparatus comprising:
   a grille having a plurality of apertures configured to permit transmission of acoustic energy generated in an audio device, said grille defining a face, and said grille configured for vertical mounting and having a first side which is lowest when said grille is vertically mounted;
   a light emitting device disposed in an opening in said face of said grille proximate to said first side of said grille and configured to illuminate a surface normal to said face by emitting light through said grille;
   a lens disposed in said opening in said grille; and
   first and second attachment members extending inwardly from said grille, said first and second members oriented at an acute angle to said face such that said first and second members are downwardly oriented when said grille is vertically mounted, and said attachment members engage said light emitting device and maintain said light emitting device in an orientation parallel to said engagement members.

2. The apparatus of claim 1, wherein the lens closes said opening in which it is disposed.

3. An apparatus, comprising:
   a motor vehicle passenger compartment door;
   a grille mounted to said door in a vertical position, said grille having a plurality of apertures configured to permit transmission of acoustic energy generated by an audio device and said grille defining a face, and said grille having a first side which is lowest;
   a light emitting device disposed in an opening in said face of said grille proximate to said first side of said grille and configured to illuminate a surface on another side of said grille by emitting light through an opening in said grille;
   a lens disposed in said opening in said grille through which light from the light emitting device passes to illuminate a foot well adjacent said door when said door is closed wherein sound from the audio device can be projected sideways, and the light is projected downwardly; and
   first and second attachment members extending inwardly from said grille, said first and second members oriented at an acute angle to said face such that said first and second members are downwardly oriented and said attachment members engage said light emitting device and maintain said light emitting device in an orientation parallel to said engagement members.

4. The apparatus of claim 3, wherein the lens closes said opening in which it is disposed.

\* \* \* \* \*